United States Patent
Watanabe et al.

(10) Patent No.: US 7,362,909 B2
(45) Date of Patent: Apr. 22, 2008

(54) CODING DEVICE AND METHOD AND DECODING DEVICE AND METHOD

(75) Inventors: Shuichi Watanabe, Chiba (JP); Shinya Hasegawa, Chiba (JP); Yasuaki Tokumo, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 697 days.

(21) Appl. No.: 10/410,167

(22) Filed: Apr. 10, 2003

(65) Prior Publication Data

US 2004/0202246 A1    Oct. 14, 2004

(51) Int. Cl.
  G06K 9/36  (2006.01)
  G06K 9/68  (2006.01)
  G06F 7/00  (2006.01)

(52) U.S. Cl. .................. 382/240; 382/226; 707/101

(58) Field of Classification Search ............. 382/232, 382/233, 240, 226; 707/101
See application file for complete search history.

(56) References Cited

U.S. PATENT DOCUMENTS

| | | | | |
|---|---|---|---|---|
| 4,751,684 A | * | 6/1988 | Holt | 365/231 |
| 5,758,353 A | * | 5/1998 | Marquis | 707/201 |
| 5,956,026 A | * | 9/1999 | Ratakonda | 715/723 |
| 5,982,938 A | * | 11/1999 | Dube | 382/240 |
| 6,414,610 B1 | * | 7/2002 | Smith | 341/106 |
| 6,889,226 B2 | * | 5/2005 | O'Neil et al. | 707/100 |
| 6,898,607 B2 | * | 5/2005 | Rising et al. | 707/104.1 |

FOREIGN PATENT DOCUMENTS

JP   2003-92757 A    3/2003
WO   2004/070955 A1  8/2004

OTHER PUBLICATIONS

Patent Abstract of Japan, 2001-335997 (Sharp Corporation) Mar. 28, 2003.
ISO/IEC JTC 1/SC 29/WG 11 N 4001, "Text of ISO/IEC FCD 15938-1 Information Technology—Multimedia Content Description Interface—Part 1 Systems", Mar. 2001.

* cited by examiner

Primary Examiner—Colin LaRose
(74) Attorney, Agent, or Firm—Nixon & Vanderhye PC (57) ABSTRACT

The present invention makes it possible to effectively encode/decode position information of leaves or nodes in tree-structured information by using a less amount of bits. The coding device according to the present invention includes a branching layer discriminating portion for identifying a hierarchical layer in which a leaf or node and a preceding leaf or node are separately branched and a position information coding portion for outputting a code corresponding to the identified hierarchical layer as a position information code for the leaf or node. Namely, merely information indicating a hierarchical layer in which a current leaf or node and a preceding leaf or node are separately branched is encoded as the position information of the leaf or node, thus increasing the efficiency of encoding leaf or node positions in the tree-structured information.

15 Claims, 10 Drawing Sheets

| POSITION INFORMATION CODE #1-1 | POSITION INFORMATION CODE #1-2 | POSITION INFORMATION CODE #1-3 | POSITION INFORMATION CODE #1-4 | POSITION INFORMATION CODE #1-5 | POSITION INFORMATION CODE #2-1 | TERMINATION CODE |
|---|---|---|---|---|---|---|
| 000 000 | 01 | 01 | 01 | 01 | 10 | 00 |

CODING DEVICE AND METHOD AND DECODING DEVICE AND METHOD

BACKGROUND OF THE INVENTION

The present invention relates to a technology of encoding and decoding a leaf or node position of an element in tree-structured information. More particularly, this invention relates to a device and a method of effectively encoding and decoding position information for each of leaves or nodes in any kind of tree-structured information.

The tree-structured data representation is widely used in various fields of information processing. A representative example is a technique of representing retrieval information of a video content, which is used in ISO/IEC FCD 15938-1. Generally, a video content may be constructed in such a hierarchy that it is composed of one or more scenes each of which is composed of one or more shots or other scenes.

The MPEG-7 standard, in order to facilitate retrieval of data in a video content, defines a technique of describing retrieval information showing a feature such as intensity of motions and color histogram added to each shot. In this case, the hierarchy of the video content can be represented by a tree structure as shown in FIG. 1.

Figure 1:
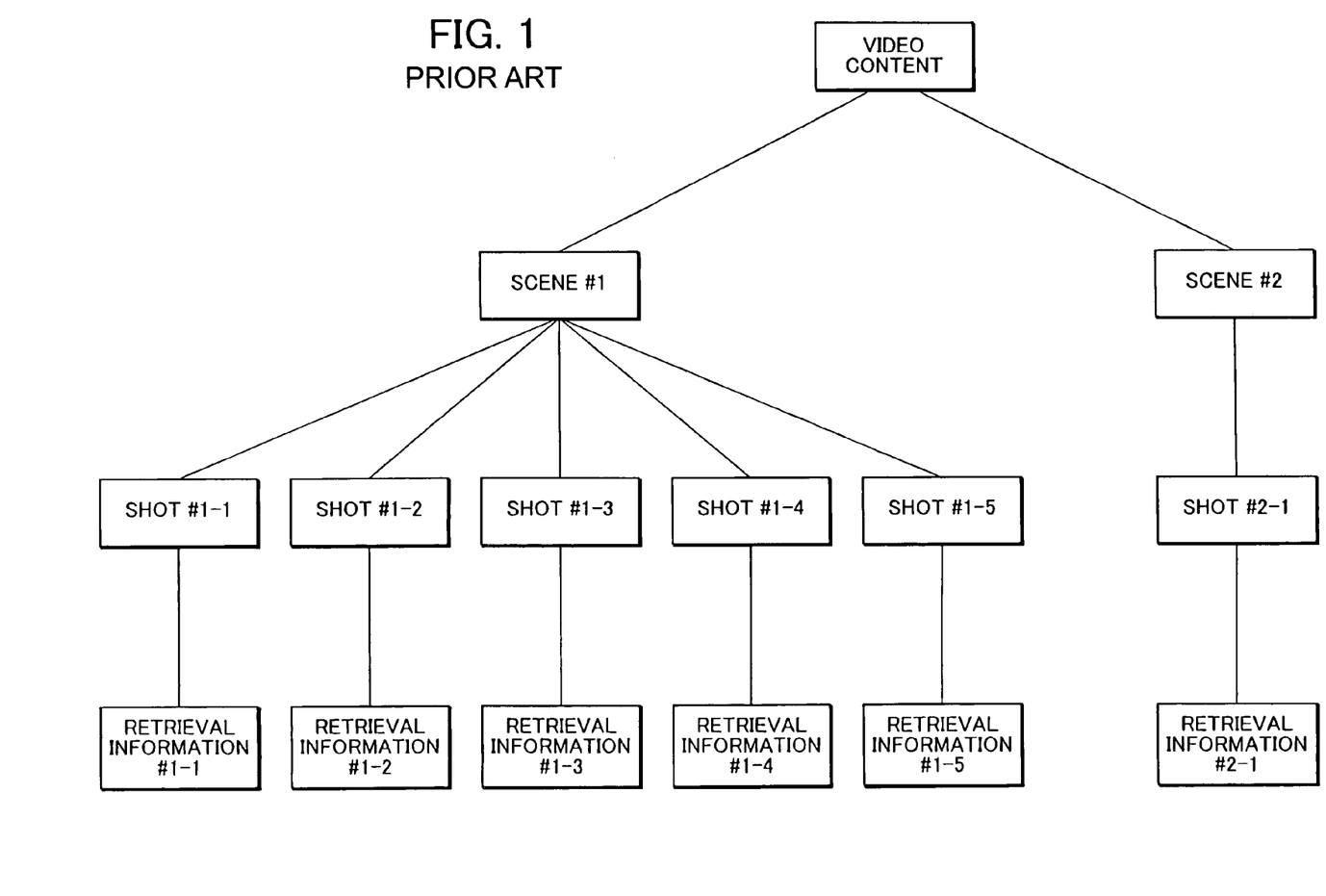
FIG. 1 illustrates an example of tree-structured retrieval information.

In the example shown in FIG. 1, a video content is composed of two scenes #1 and #2 and the scene #1 is composed of five shots #1-1 to #1-5. The scene #2 is composed of a single shot #2-1. Each shot is given retrieval information.

In the shown tree structure, a video content corresponds to a root of the tree and scenes and shots correspond to nodes thereof. The scenes are the first branched nodes, viewed from the root, of the tree hierarchy, which are nodes in the first hierarchical layer. The shots are therefore nodes in the second hierarchical layer. Retrieval information corresponds to a leaf of the tree. Scenes or shots with smaller numerals correspond to preceding scenes or shots in the sequence.

In case there is a desire to collectively store all of retrieval information corresponding to the leaves of the tree structure, it is also necessary to store at the same time position information for each of the retrieval information. In other words, it is needed to add position information specifying that the retrieval information links to which scene number and which shot number. A method of representing position information, which is used in ISO/IEC FCD 15938-1, is as follows:

In the above-mentioned committee draft, all nodes located in hierarchical layers under a certain node are numbered by sequential numbers from 1 and position information for a leaf is represented by listing numbers of all relevant nodes being in a path from the root node to the leaf.

This method is now used to prepare position information for retrieval information #1-3 shown in FIG. 1. In the first hierarchy, the scene #1 to which the retrieval information #1-3 belongs is a leftmost node hanging from a video content corresponding to the root of the tree structure. Therefore, position information in the first hierarchical layer is No. 1.

In the second hierarchy, the shot #1-3 to which the retrieval information #1-3 belongs is the third of left nodes hanging from the scene #1 in a higher hierarchical layer. The position information in the second layer is No. 3. Therefore, the position information of the retrieval information #1-3 is expressed by (1, 3). (More strictly, this information represents positions of relevant nodes. Although the retrieval information corresponds itself to a leaf existing in the third layer in the tree hierarchy, the number of retrieval information for the shot is limited to 1 in the shown case and therefore the position information of the node is used as the position information of the retrieval information. If there is a plurality of leaves, a leaf number is further attached thereto.)

The above-described position information is hereinafter referred to as position information in the absolute addressing mode. This mode can uniquely represent each of all leaf positions.

The number of bits necessary to store position information in the absolute addressing mode for the shown example will be estimated below. To calculate the number of bits necessary to represent all nodes in each layer of the tree hierarchy, it is necessary to determine in advance the maximum number of possibly growing branches. For example, if the first and second hierarchical layers can have each 8 branches from each node, three bits are required to represent each of the nodes in each hierarchical layer.

Figure 2:
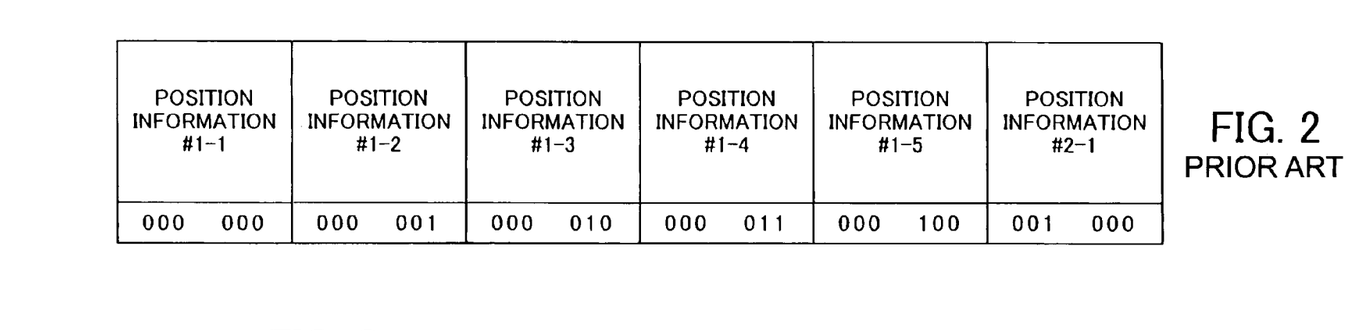
FIG. 2 illustrates position information code encoded by a prior art method.

Therefore, six (6) bits (3 by 2 bits) are needed to store the position information of one leaf. As there are six (6) leaves in the tree structure shown in FIG. 1, thirty six (36) bits (6 by 6) are needed for the shown case. FIG. 2 shows an example of coded position information for all retrieval information shown in FIG. 1 according to the above-described rule.

The above-described prior art method whereby position information for each of leaves or nodes are encoded in the absolute addressing mode, however, involves such aproblem that the number of bits necessary to store position information for leaves or nodes of the tree structure increases as the number of branches of each of hierarchical layers increases. In general, a video content contains a very large number of scenes or shots, i.e., a huge number of possible branches may be produced, making the bit problem more significant and, therefore, can not be ignored.

SUMMARY OF THE INVENTION

Accordingly, an object of the present invention is to provide a coding/decoding method and device capable of effectively encoding/decoding position information of leaves or nodes in the tree structured data system by using a less amount of bits.

Another object of the present invention is to provide a coding device for encoding position information for each of leaves or nodes of a tree structure composed of one or more hierarchical layers each having one or more leaves or nodes sequentially ordered in the same hierarchical layer, which is provided with a branching layer discriminating means for identifying a hierarchical layer in which a leaf or node and a preceding leaf or node are separately branched and a position information coding means for outputting a code corresponding to the identified hierarchical layer as a position information code of the leaf or node.

Another object of the present invention is to provide a coding device which is further provided with a number-of-layers deciding means for determining the number of hierarchical layers possibly branching off in the tree structure and a bit size calculating means for calculating the number of bits necessary for coding position information based on the determined number of layers, and the position information coding means for encoding the position information with bits not more than the calculated bit size.

Another object of the present invention is to provide a coding device which is further provided with a skip-indication coding means which encodes, if there is a lacking part of a leaf or node in the tree structure, information indicating the occurrence of the lack thereat.

Another object of the present invention is to provide a coding method of encoding position information for each of leaves or nodes of a tree structure composed of one or more hierarchical layers each having one or more leaves or nodes sequentially ordered in each hierarchical layer, which is capable of identifying a hierarchical layer in which a leaf or node and a preceding leaf or node are separately branched and outputting a code corresponding to the identified hierarchical layer as a position information code of the leaf or node.

Another object of the present invention is to provide a decoding device for decoding position information codes for leaves or nodes of a tree structure composed of one or more hierarchical layers each having leaves or nodes sequentially ordered in each hierarchical layer, which is provided with a branching layer discriminating means for identifying from respective position information codes a hierarchical layer in which a leaf or node and a preceding leaf or node are separately branched and a position information updating means for incrementing the position number of the branching layer in the position information of the preceding leaf or node and initializing into an initial value each of position numbers in all hierarchical layers lower than the branching layer in the position information of the preceding leaf or node in the tree structure.

Another object of the present invention is to provide a decoding device in which the position information updating means does not output position information of a leaf or node with an input of skip information indicating that the leaf or node has a lacking part.

Another object of the present invention is to provide a decoding method of decoding position information codes for leaves or nodes of a tree structure composed of one or more hierarchical layers each having one or more leaves or nodes sequentially ordered in the same hierarchical layer, which is capable of identifying, from respective position information codes, a hierarchical layer in which a leaf or node and a preceding leaf or node are separately branched and updating by incrementing the position number of the identified hierarchical layer in the position information of the preceding leaf or node and initializing into an initial value each of position numbers of all hierarchical layers lower than the branching layer in the position information of preceding leaf or node in the tree structure.

PREFERRED EMBODIMENT OF THE INVENTION

A coding device according to the first embodiment of the present invention will be described below with reference to FIGS. 3 to 5 and FIG. 1.

This embodiment is described in the case of encoding retrieval information (leaf layer information) and position information for the retrieval information of a tree-structured video content shown in FIG. 1. However, it is noted what is newly disclosed by the present invention relates to coding and decoding the position information. In FIG. 1, the video content is composed of two scenes #1 and #2. The scene #1 is further composed of five shots #1-1 to #1-5 and the scene #2 is composed of a single shot #2-1. Each of the shots is provided with retrieval information. In this tree structure, the scenes and shots correspond to nodes and the retrieval information corresponds to a leaf of the tree structure. Scenes and shots are sequentially numbered, and a smaller number represents a preceding scene or shot.

To retrieve the video content by using the retrieval information shown in FIG. 1, as described before in the prior art part, position information in the absolute addressing mode may be attached to each of the retrieval information. This allows flexible retrieval of any element in the content by using any of scene or shot numbers as a key. However, in order to store and transmit a set of merely retrieval information arranged in a sequential order, it is necessary to more effectively encode position information for each of the retrieval information. This is realized by a position information coding device according to the embodiment shown in FIG. 3.

Figure 3:
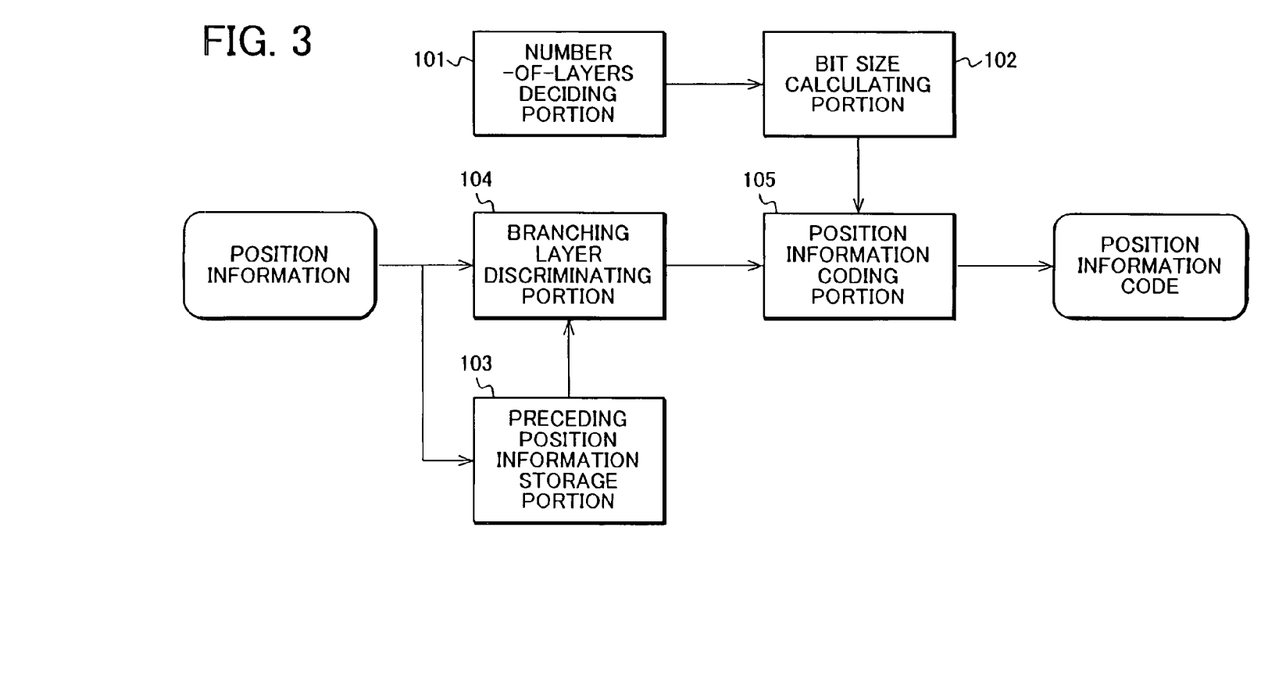
FIG. 3 is a functional block diagram showing a schematic construction of a coding device according to the first embodiment of the present invention.

In the schematic construction of the embodiment of FIG. 3, a number-of-layers deciding portion 101 determines the number of hierarchical layers which can be branched from the root to an objective leaf (retrieval information to be encoded) in the tree structure. As the tree structure shown in FIG. 1 has two hierarchical layers that may branch off respectively, "2" is output. Although all layers in the tree structure of FIG. 1 can branch off, the embodiment is not limited to dealing with the above-described structure and can be adapted to any tree structure including a node layer that cannot branch out. In the latter case, the number of node layers that can branch out is counted.

In the tree structure of FIG. 1, the lowest leaf layer cannot have a branch (i.e., one shot has a single piece of retrieval information). The present embodiment is not limited to the above and may have leaves that further branch off (one shot has a plurality of pieces of retrieval information). In that case, the leaf layer may be counted as a layer that can be branched.

A bit size calculating portion 102 determines the number of bits necessary to represent position information based on the number-of-layers determined by the number-of-layers deciding portion 101. The number of bits is determined as an integer most approximating to and not less than the number to be calculated according to the following equation 1.

$$\text{Log 2 (the number of hierarchical layers+1)} \quad (1)$$

Namely, an integer closest to and not less than the value log 2 (2+1) is 2 to be output for the tree structure shown in FIG. 1.

Although the present embodiment is provided with the number-of-layers deciding portion 101 and the bit size calculating portion 102, a position information coding device according to the present invention may not always require the provision of those portions if the number of necessary bits is given in advance, for example.

A preceding position information storage portion 103 holds position information inputted just before the current position information. The position information is information indicating, in the example of FIG. 1, a shot of a scene, to which retrieval information corresponding to a leaf in the tree-structured video content belongs. In practice, it may be considered as the position information described in the absolute addressing mode for the tree structure of the video content.

For example, the retrieval information #1-3 belonging to shot No. 3 of scene No. 1 is given position information (1, 3) in the absolute addressing mode. However, the position information to be input is not be restricted to scene No. and shot No. and it may be for example the beginning time of a scene and the beginning time of a shot.

In FIG. 1, the first leaf is the retrieval information #1-1 followed by the retrieval information #1-2, #1-3, #1-4, #1-5 and #2-1 in the said order. Therefore, the position information stored in the preceding position information storage portion 103 for example when coding the position information for the retrieval information #1-3 is the position information for the retrieval information #1-2.

A branching layer discriminating portion 104 compares currently inputted position information with position information stored in the preceding position information storage portion 103, determines a hierarchical layer in which both position information have separate nodes and then outputs information indicating the hierarchical layer. In the tree structure shown in FIG. 1, the branching layer is defined as a hierarchical layer at which the retrieval information corresponding to the inputted position information and the retrieval information corresponding to the position information stored in the preceding position information storage portion 103 are separated first from each other as two separate nodes when routing the paths in tree structure from the root to both retrieval information. Both sets of the position information expressed in the absolute addressing mode have different values for the branching layer when looking both sets of values from left to right.

For example, the input position information is of (1, 3) in absolute addressing mode and the position information stored in the preceding position information storage portion 103 is of (1, 2) in the same mode. It is apparent from the above description that both sets of corresponding retrieval information are separated in the lowest layer, i.e., of the shots, and belong to the same upper layer. Accordingly, the branching layer discriminating portion 104 outputs for example "1" as information indicating the lowest layer.

If the input position information is of (2, 1), the position information of (1, 5) is previously stored in the preceding position information storage portion 103. It is found from the above that separation occurred in the layer second from the bottom (i.e., the scene layer). Therefore, the branching layer discriminating portion 104 outputs for example "2" as information indicating the layer being the second from the bottom.

Although this embodiment adopted a method of identifying a branching hierarchical layer by comparing the currently input position information with the stored preceding position information, the coding device according to the present invention is not restricted to the above and can determine the branching layer from merely the input position information if the tree structure has known regularity. In that case, the preceding position information storage portion 103 may be omitted.

The position information coding portion 105 generates a code corresponding to a hierarchical layer identified by the branching layer discriminating portion 104 by using bits within a bit size output from the bit size calculating portion 102 and outputs the code generated as the position information code. However, with respect to the position information first inputted, scene number and a shot number are directly output since it has no precedent.

After putting position information code of the last position information for the retrieval information #2-1, a termination code indicating no remaining position information is outputted. Alternatively, when a part, e.g., the scene #1 and thereafter, of the tree structure of FIG. 1 is cutout and input to the coding device according to this embodiment of present invention, the termination code is output after encoding the position information for the retrieval information #1-5. The practical allocation of bit codes based on the above is described below in Table 1.

TABLE 1

| Code (Decimal Notation) | Meaning |
|---|---|
| 00 | Termination Code |
| 01 | Indicates that branching occurred in the Lowest Layer (i.e., the layer of shots) |
| 10 | Indicates that branching occurred in the layer second from the bottom (i.e., the layer of scenes) |
| 11 | Unused |

Figure 4:
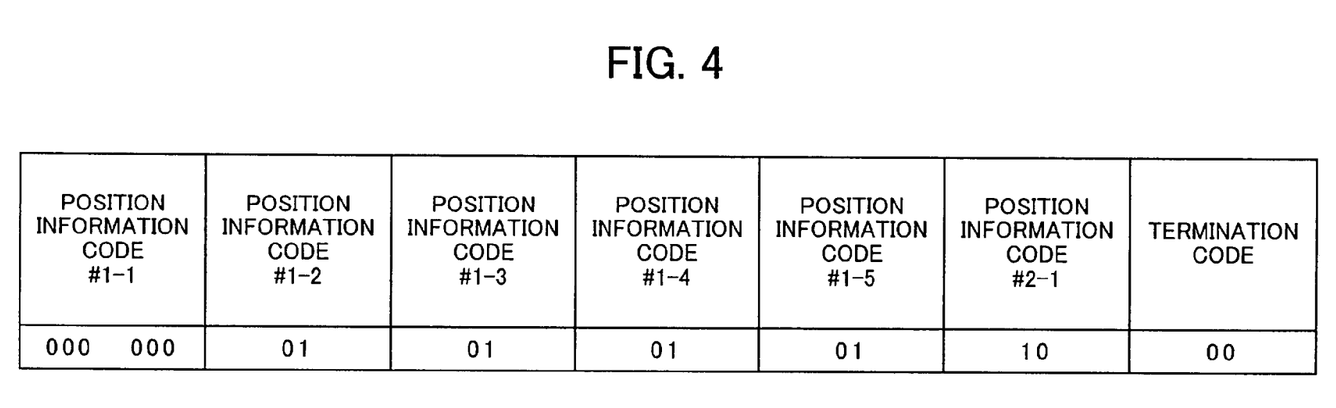
FIG. 4 is illustrative of position information code encoded by the coding device according to the first embodiment of the present invention.

In FIG. 4, there is shown an example of coded position information for retrieval information of the video content shown in FIG. 1, which is coded by the position information coding device according to this embodiment by using bit codes allocated as shown in Table 1.

In the described embodiment, the bit size information output from the bit size calculating portion 102 is referred to by the position information coding portion 105 only when coding the position information and is not explicitly output from the position information coding device. It is, however, possible to adopt a technique of outputting the number-of-bits information included in the position information code.

In this embodiment, the tree structure composed of two layers (a layer of scenes and a layer of shots) as shown in FIG. 1 is dealt with as described above. However, the position information coding device is not limited to the above and may be applied to encode position information in any tree structure having any number of hierarchical layers. For example, the coding device according to the present invention can be adaptable with no trouble to such a case where one scene is divided into a plurality of scenes.

Figure 5:
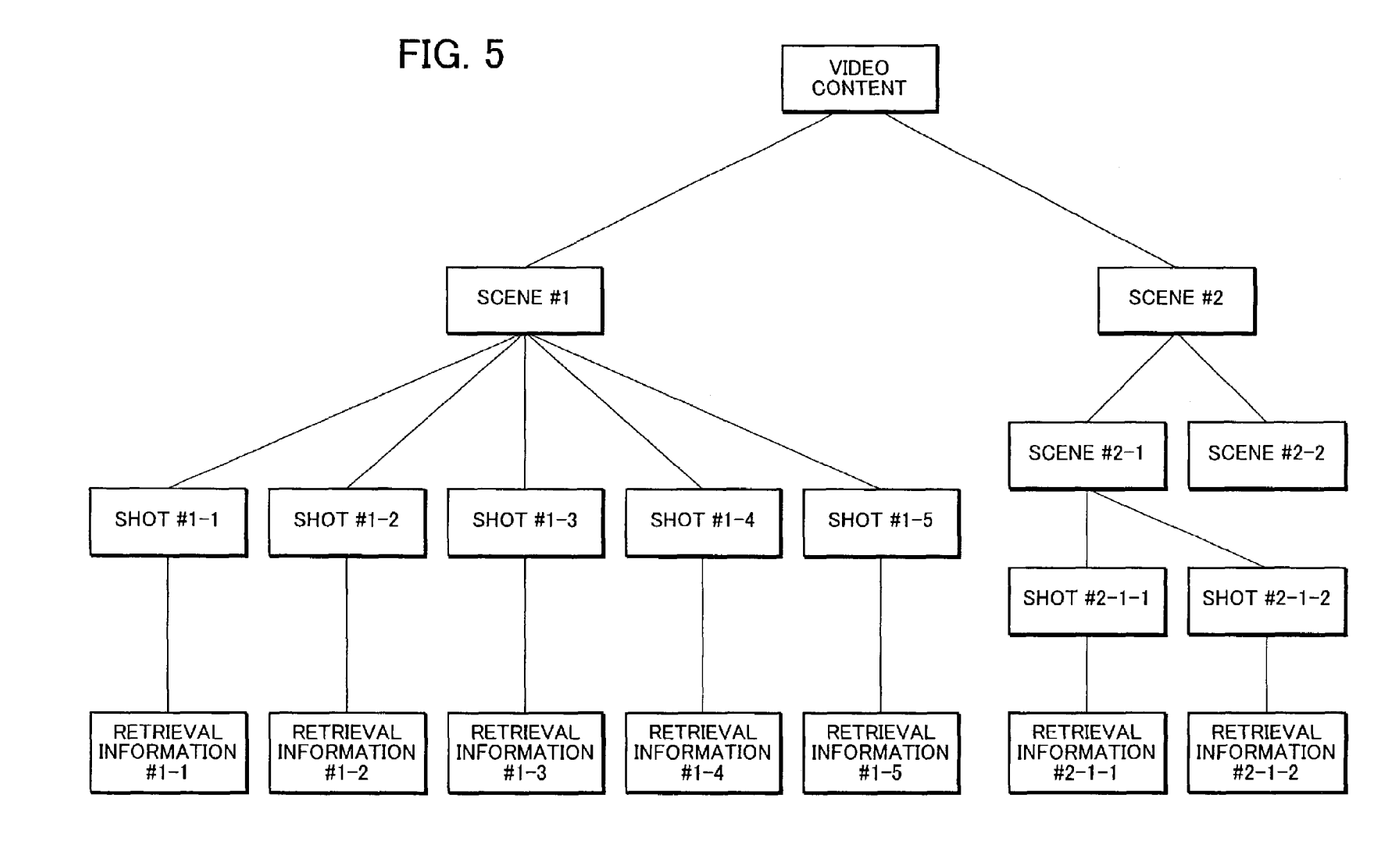
FIG. 5 illustrates another example of tree-structured retrieval information used for the first embodiment of the present invention.

Alternatively, the coding device can be applied to any more complex tree structure as shown in FIG. 5. In FIG. 5, a scene #2 has scenes #2-1 and #2-2 under there. The scene #2-1 composes of shots #2-1-1 and #2-1-2. In this case, merely a set of retrieval information belonging to the same hierarchical layer is extracted and then the position information of the objective retrieval information is coded by the position information coding device according to the present invention. By doing so, effective coding of position information can be achieved.

For example, the retrieval information #1-1 to #1-5 are belonging to the same hierarchical layer and therefore the position information for them can be coded directly by the position information coding device of the present invention. On the other hand, the retrieval information #2-1-1 to #2-1-2 belongs to a layer different from that of the retrieval information #1-1 to #1-5. Therefore, the retrieval information #2-1-1 to #2-1-2 can not be processed together with the retrieval information #1-1 to #1-5 but they belong to the same layer and can therefore be coded together by the coding device of the present invention.

As described above, the present embodiment does not describe position information of each leaf in a tree structure as it is but describes a changing point of the current (leaf) position information from the just preceding (leaf) position information. In comparison with the prior art, the present embodiment can more effectively encode position information with a smaller amount of bits.

In the example of coding position information for retrieval information as shown in FIG. 1, the prior art coding method requires 36 bits as shown in FIG. 2 while the instant embodiment method requires merely 16 bits as shown in FIG. 4. In the shown case, the difference between the both methods is relatively small. However, in the case of one video content that may in practice contain several hundreds of scenes, the difference between total bits consumed by the prior art and the present method respectively may be considerably increased.

Figure 6:
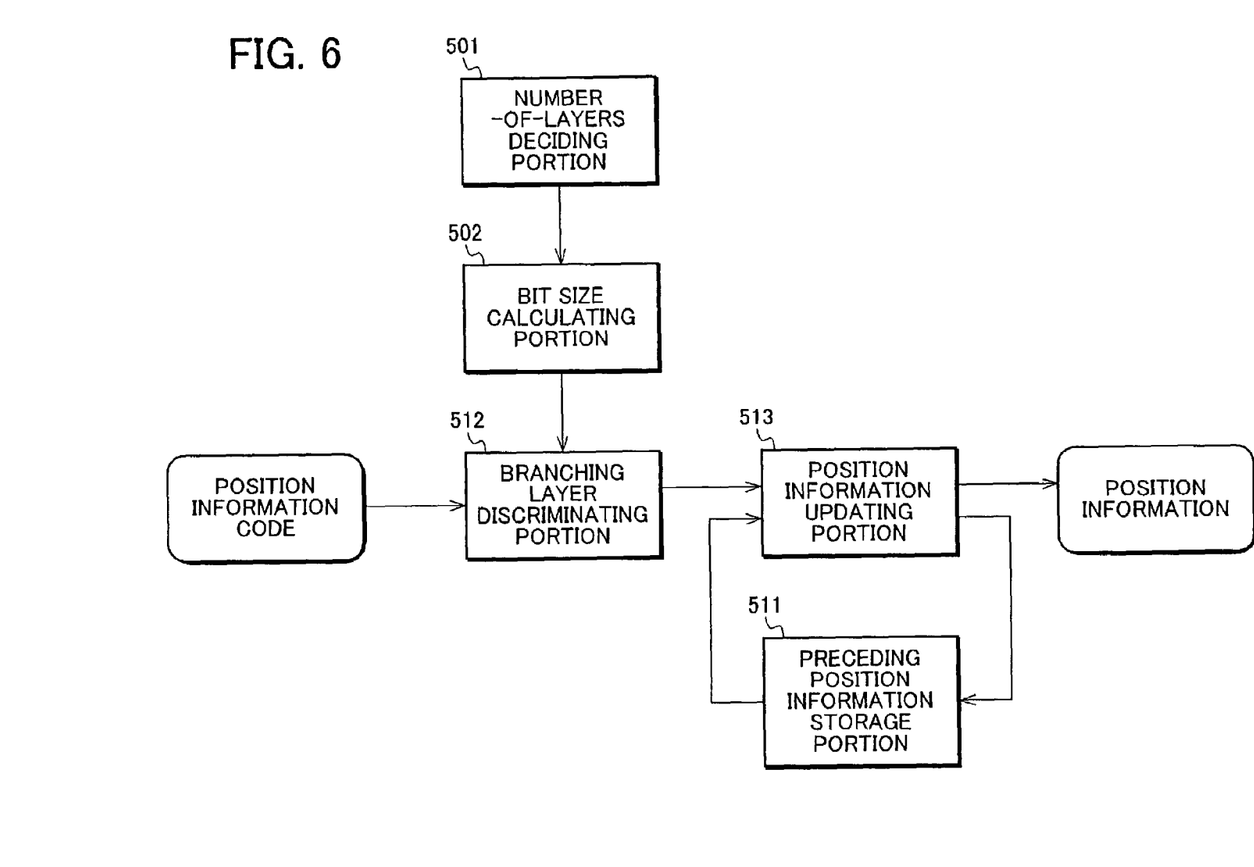
FIG. 6 is a functional block diagram showing schematic construction of a decoding device according to the second embodiment of the present invention.

Referring now to FIG. 6, a decoding device according to the second embodiment of the present invention will be described below. The following example relates to the case when the embodiment works with position information codes shown in FIG. 4, each position information code represents coded position information of retrieval information corresponding to a leaf in the tree structure shown in FIG. 1. The position information can be encoded by the position information coding device described above as the first embodiment of the present invention. The input codes are, of course, not limited to the above-described position information codes.

In FIG. 6, there is a schematic illustration of the embodiment, wherein a number-of-layers deciding portion 501 determines how many hierarchical layers capable of branching out exist in the tree structure to be decoded by this embodiment. A bit size calculating portion 502 calculates the number of bits composing the coded position information based on the number of hierarchical layers which was determined by the number-of-layers deciding portion 501. The operations of these portions are similar to those of the number-of-layers deciding portion 101 and the bit size calculating portion 102 according to the first embodiment of the present invention and therefore will not be further described.

The decoding device according to the present invention does not necessarily use the number-of-layers deciding portion 501 and the bit size calculating portion 502. If information corresponding to the number-of-bits information output from the bit size calculating portion 502 is encoded together with the position information code, it may be used instead of the output of the bit size calculating portion 502.

A preceding position information storage portion 511 stores position information decoded just before a current position information to be decoded. A branching layer discriminating portion 512 identifies a layer in which the current decodable position information and the position information stored in the preceding position information storage portion 511 are separately branched. For example, if a current objective code is of the sixth block from the left in FIG. 4, its position information code is 10 in FIG. 4 and indicates (in table 1) that the current position information was separated from the preceding position information in the second (i.e., scene) layer from the bottom.

A position information updating portion 513 increases by 1 the position number of the identified layer outputted from the branching layer discriminating portion 512, which position number is in the position information stored in the preceding position information storage portion 511, and then initializes into an initial value each of position numbers of all layers being lower than the identified layer. All position numbers of all upper layers are held as unchanged. The position numbers in the position information expressed for example in the absolute addressing mode correspond to serial numbers given to nodes existing in each hierarchical layer.

If a decodable objective code is of the sixth block from the left in FIG. 4, the position information (1, 5) for the retrieval information #1-5 decoded from the fifth block code is stored in the preceding position information storage portion 511.

The branching layer discriminating portion 512 outputs information indicating that the branching occurred in the second layer from the bottom. The position information updating portion 513 increases the position number in the second layer from the bottom by 1 to obtain the expression (2, 5) and then initializes each of the position numbers in each of layers lower than the second (scene) layer into an initial value 1 to obtain the expression (2, 1).

Thus, the position information to be finally output has the expression (2, 1) indicating the correctly decoded position information of the retrieval information #2-1. This position information is then stored in the preceding position information storage portion 511 to use for next decoding operation. The decoding of position information is finished when the branching layer discriminating portion 512 receives the termination code.

Figure 7:
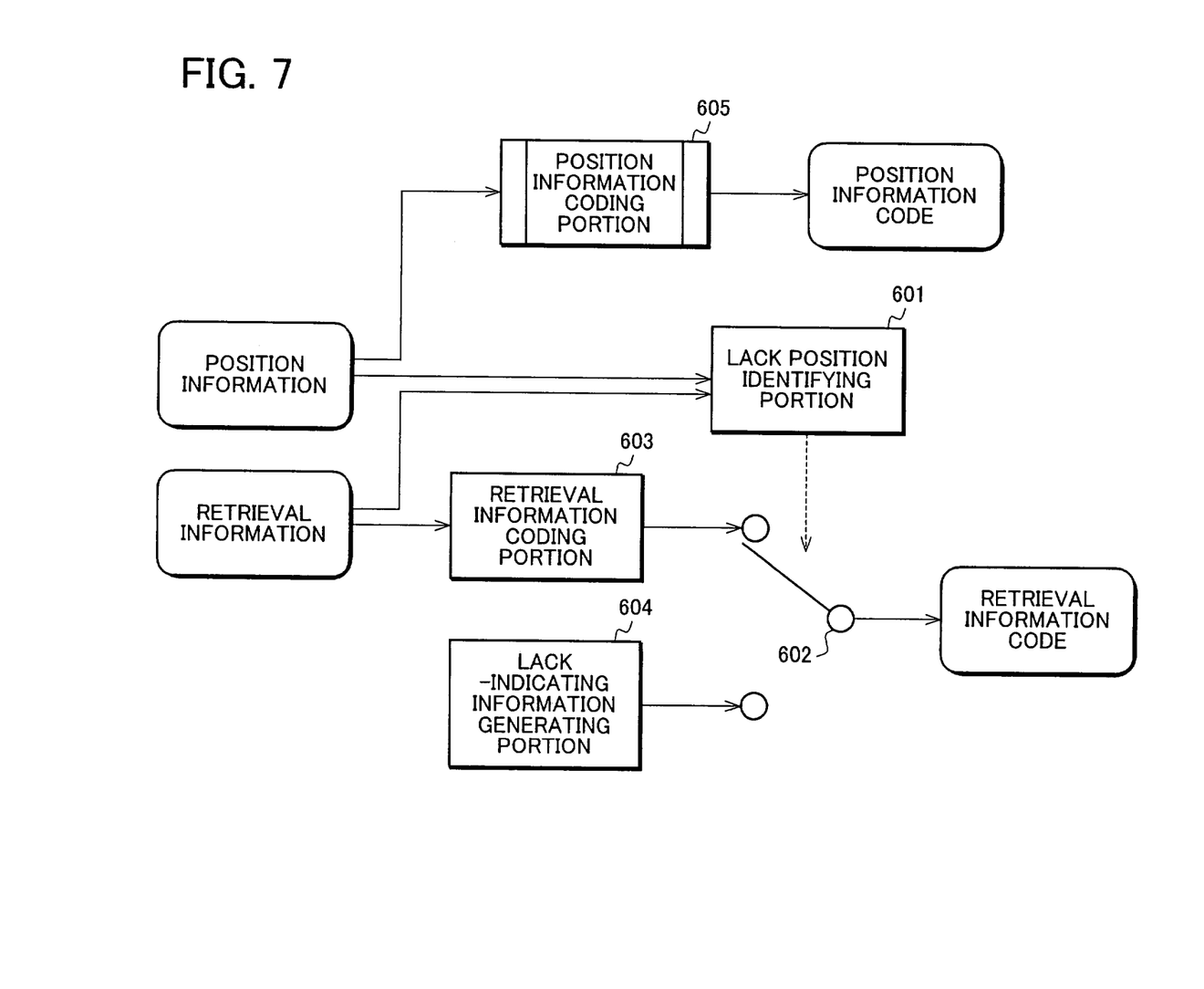
FIG. 7 is a functional block diagram showing schematic construction of a coding device according to the third embodiment of the present invention.
Figure 8:
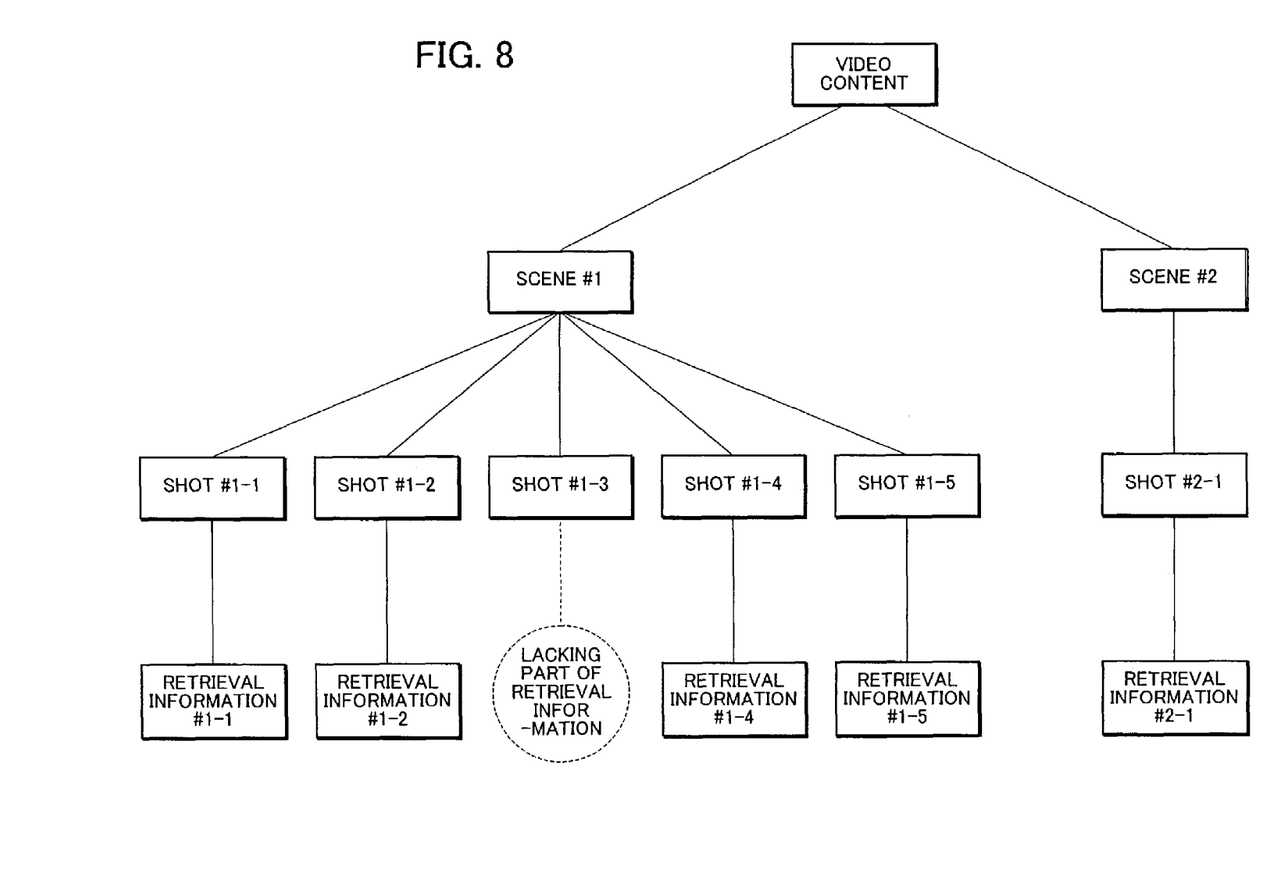
FIG. 8 illustrates an example of tree-structured retrieval information used for the third to sixth embodiments of the present invention.

Referring now to FIGS. 7 and 8, a coding device according to the third embodiment of the present invention will be described below.

FIG. 7 is a functional block diagram schematically depicting the construction of the embodiment, wherein a position information coding portion 605 has an internal construction shown in FIG. 3. FIG. 8 is a view for explaining retrieval information of a tree-structured video content which is the object to be processed by the coding device according to the embodiment of the present invention. The video content of FIG. 8 is similar to the video content of FIG. 1 but differs from the latter by the fact that a shot #1-3 lacks retrieval information belonging thereto (in other words, no leaf belongs to the shot #1-3).

Although the embodiment in this example works with the tree-structured video content with a lacking leaf corresponding to one of retrieval information therein, a position information coding device according to the embodiment of the present invention can be also applied to such a case the content also contains other kinds of retrieval information desirable to be discriminated.

For example, it is considered that shots #1-1, #1-2, #1-4 and #1-5 in FIG. 8 contains retrieval information A and a shot #1-3 contains retrieval information B (not A). The embodiment can work with the above-described video content for example by extracting and using only the position information for retrieval information A in the same way as it works with the video content containing a lack of retrieval information.

If the tree structure lacks a leaf as shown in FIG. 8, the position information coding portion 605 encodes position information for each of retrieval information (irrespective of whether it lacks information or not) by allocating serial number codes. Information as to a vacant position is encoded by a special coding means. This allows the coding of position information without failure. The special coding means may in practice encode "lack"-indicating information, instead of "retrieval" information, for the vacant part.

If the input position information are not serial numbers in the absolute addressing mode and have a lacking number therein, then a lack position identifying portion 601 operates a switch 602 in the following manner. When input position information are serial position numbers with no lacking number, the switch 602 is operated to cause a retrieval information coding portion 603 to output retrieval information codes.

If there is a lacking number, the switch 602 is operated to cause a lack-indicating information generating portion 604 to output lack-indicating information code instead of the retrieval information code. In this case, the position information coding portion 605 outputs a position information code corresponding to the lacking number. Thus, the retrieval information code in which lack-indicating information is written is obtained for the vacant part and thereby the vacant position can be located.

Although this embodiment is provided with the retrieval information coding portion 603, the coding device of the present invention may not be limited to this aspect and may output the retrieval information as it is (without coding). The present invention does not refer to coding and decoding retrieval information in itself.

Although this embodiment encodes the lack-indicating information within the retrieval information, the coding device of the present invention may not be limited to this and may encode position information of a lacking leaf in the absolute addressing mode by using a separate coding means.

Figure 9:
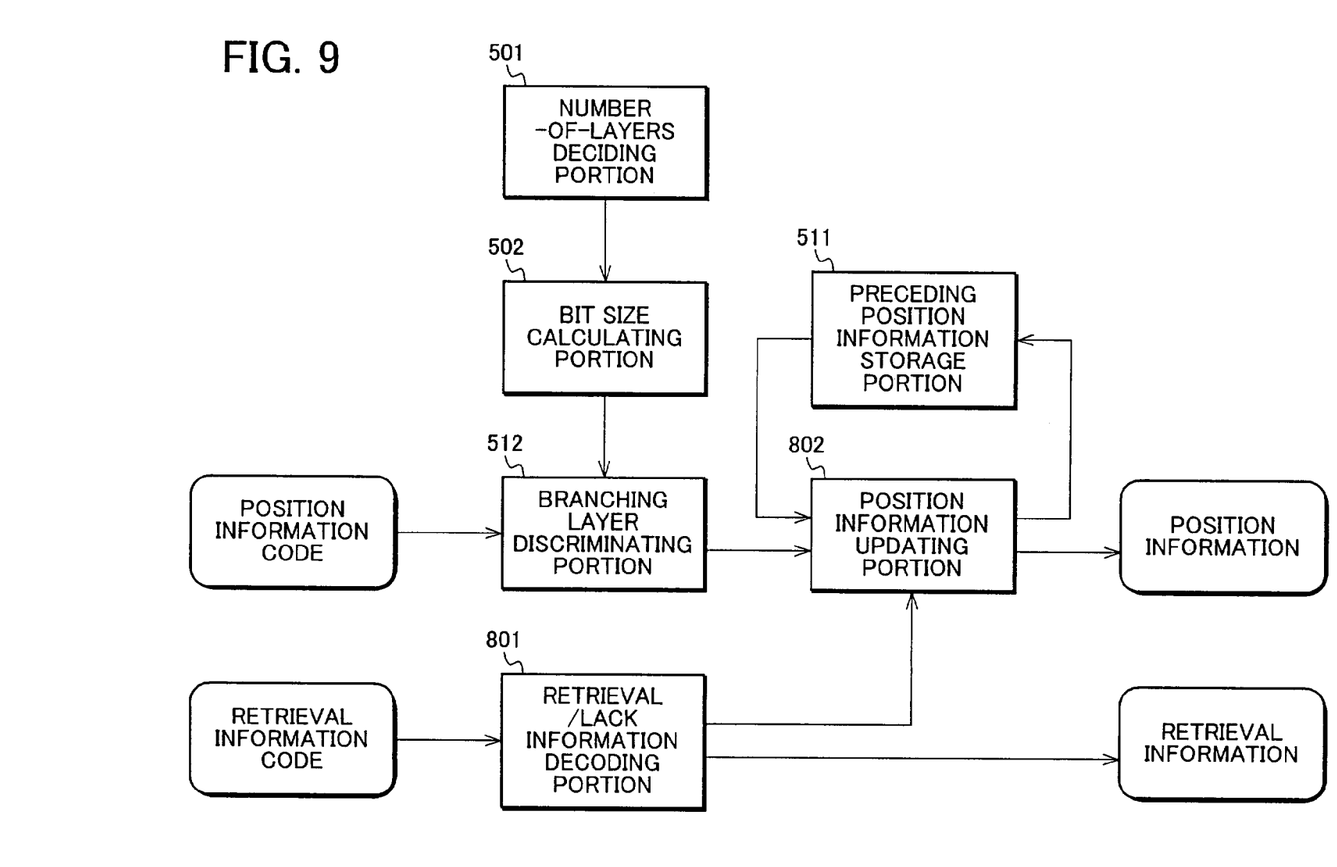
FIG. 9 is a functional block diagram showing schematic construction of a decoding device according to the fourth embodiment of the present invention.

Referring to FIG. 9, a decoding device according to the fourth embodiment of the present invention will be described below. Portions of this embodiment which are similar to those of the second embodiment are given the same numerals and will not further be described.

Now, it is assumed that coded information as to the tree-structured video content shown in FIG. 8 is input to this embodiment. The codes input to the embodiment may be, not restricted to, the position information and retrieval information coded by the position information and retrieval information coding device, respectively, of the third embodiment described above with reference to FIG. 7. The tree structure to be dealt with by this embodiment may be of FIG. 8 but not be restricted thereto.

In FIG. 9, there is shown a schematic construction of the embodiment in which a retrieval/lack information decoding portion 801 decodes input retrieval information code. If retrieval information is decoded, the retrieval/lack information decoding portion 801 outputs the decoded retrieval information. If lack-indicating information is decoded, the retrieval/lack information decoding portion 801 informs that the lack-indicating information was decoded to a position information updating portion 802. In this instance, no retrieval information is output.

The operation of the position information updating portion 802 is similar to that of the position information updating portion 513 of the second embodiment described with reference to FIG. 6 and differs by the following:

If the lack-indicating information was decoded by the retrieval/lack information decoding portion 801, the position information updating portion 802 does not output the position information for the lacking retrieval information and begins the decoding of the next position information. Thus, the processing can be continuously carried out by correctly skipping the part lacking in retrieval information.

In this embodiment, the skipping operation with the lack indicating information is carried out within the position information updating portion 802. The decoding device according to the present invention is not limited to the shown aspect and can use such a method that it does not use the position information for the lacking leaf, causing the position information updating portion 802 to operate in the same way as the position information updating portion 513 of FIG. 6 does.

Figure 10:
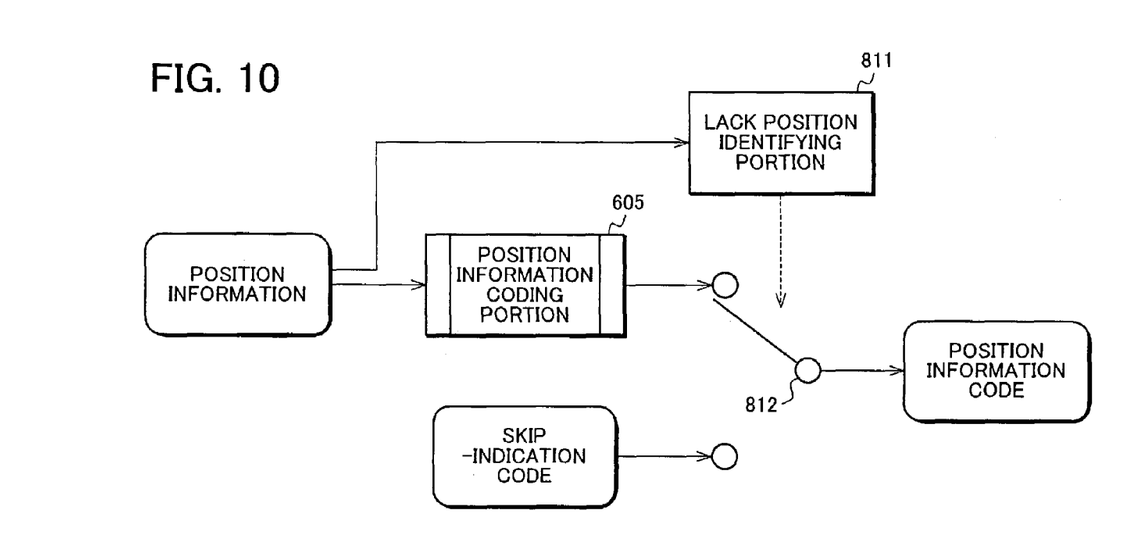
FIG. 10 is a functional block diagram showing schematic construction of a coding device according to the fifth embodiment of the present invention.
Figure 11:
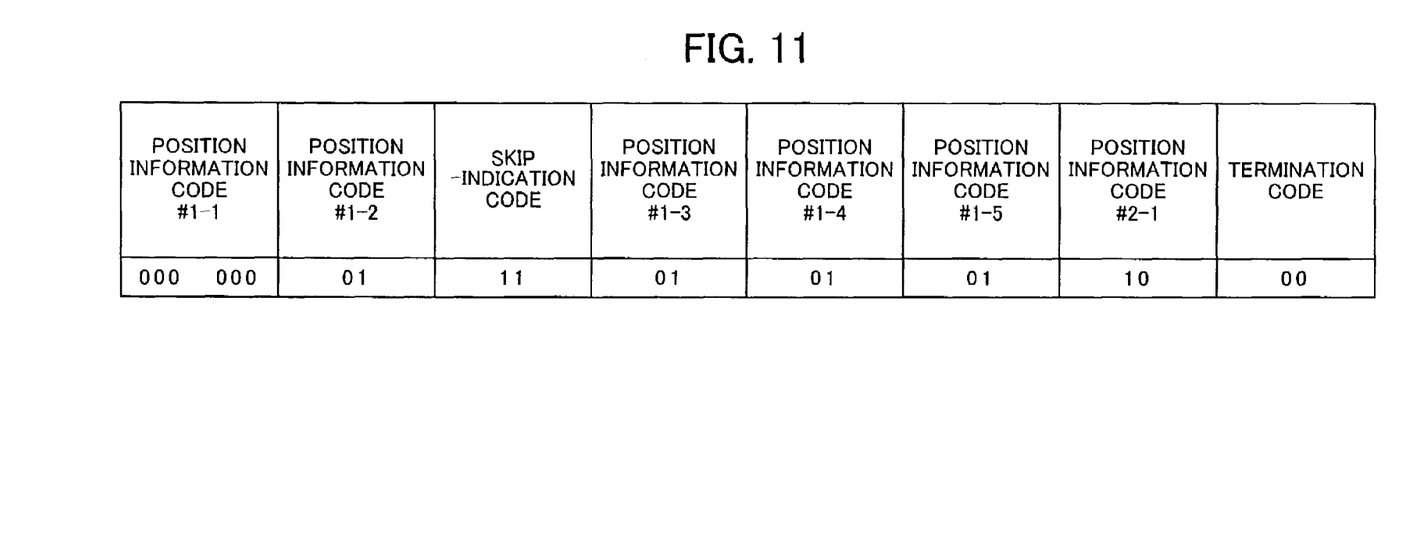
FIG. 11 is illustrative of position information code encoded by the coding device according to the fifth embodiment of the present invention.

Referring now to FIGS. 10 and 11, a coding device according to the fifth embodiment of the present invention will be described below. FIG. 10 is a functional block diagram schematically showing the construction of this embodiment. A position information coding portion 605 of FIG. 10 has the same internal construction shown in FIG. 3 as described for the embodiment of FIG. 7.

Like the third embodiment of FIG. 7, this embodiment also works to encode position information for retrieval information in the tree structure with a lack of retrieval information as shown in FIG. 8. The difference of this embodiment from the third embodiment exists in that the instant embodiment encodes lack-indicating information within the relevant position information whilst the third embodiment encodes lack-indicating information within the relevant retrieval information.

In the position information coding device shown in FIG. 10, a lack position identifying portion 811 monitors inputted position information and, when the lack of position information is detected, changes over a switch 812 to attach a skip-indication code to the series of position information code. Then, the lack position identifying portion 811 returns the switch 812 to the initial position to receive from the position information coding portion 605 a position information code corresponding to the lack position and add the received position information code to the series of position information code. Namely, a skip-indication code is put just before a code representing position information corresponding to the lack position. In other words, the code following the skip-indication code indicates that a lack of retrieval information occurred the position to be updated.

The Example of the allocation of bit codes for position information including a skip-indication code that indicates a lack of information is described below in Table 2.

TABLE 2

| Code (Decimal Notation) | Meaning |
| --- | --- |
| 00 | Termination Code |
| 01 | Indicates that branching occurred in the Lowest Layer (i.e., of shots) |
| 10 | Indicates that branching occurred in the second layer (i.e., of scenes) from the bottom |
| 11 | Skip-indication code that indicates a lack of information occurred at the position specified by a code following the skip-indication code. |

In this case, the number of bits necessary for representing the position information is determined as an integer closest to and not less than the number to be calculated according to the following equation (2), which represent the number of hierarchical layers, a termination code and a skip-indication code.

$$\log 2 \text{ (the number of layers+2)} \qquad (2)$$

Namely, in the case of the tree structure shown in FIG. 8, 2 bits is given which is an integer closest to and not less than log 2(2+2). (This bit size is calculated by the bit size calculating portion 102 being a component of the position information coding portion 605.) In FIG. 11, there is shown an example of position information codes generated by encoding with the codes (table 2) the position information for the retrieval information shown in FIG. 8.

In FIG. 11, a skip-indication code put just before position information code #1-3 indicates the occurrence of a lack of retrieval information in the place specified by the position information code #1-3 following the skip-indication code. In this way, the position information can be coded for the lacking retrieval information in the tree structure shown in FIG. 8.

Figure 12:
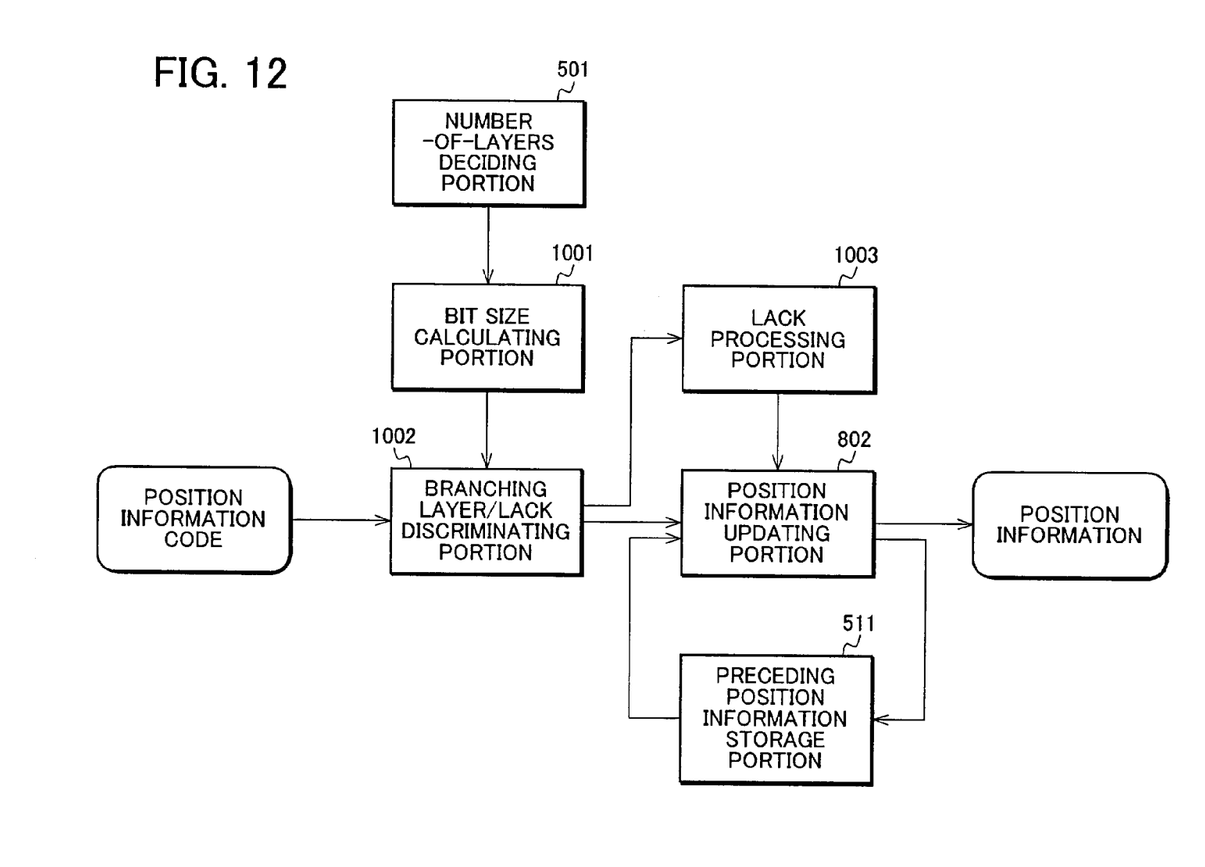
FIG. 12 is a functional block diagram showing schematic construction of a decoding device according to the sixth embodiment of the present invention.

Referring now to FIG. 12, a decoding device according to the sixth embodiment of the present invention will be described below. In FIG. 12, portions similar to those of the second or fourth embodiment of the present invention are given the same numerals and will not be further described.

The operation of the position information decoding device according to the present embodiment is described in the case of inputting thereto position information code shown in FIG. 11. The position information code may be the position information code coded the position information of retrieval information (leaf) in the tree structure shown in FIG. 8, which may be obtained by the position information coding device of the fifth embodiment described above. However, the input (position information code) to this embodiment is not restricted to the above and the tree structure to be dealt with by this embodiment is not restricted to that shown in FIG. 8.

In FIG. 12, there is shown a schematic construction of the embodiment in which a bit size calculating portion 1001 determines the number of bits in the position information code according to the equation 2 based on the number of hierarchical layers determined by the number-of-layers deciding portion 501. As described for the second and fourth embodiments, the decoding device of the present invention does not always require the provision of the number-of-layers deciding portion 501 and bit size calculating portion 1001 and can work without having to use those portions. For example, if the number of bits is encoded and included in the position information code, the decoding device can directly use the code in the input position information code instead of the output of the bit size calculating portion 1001.

In the embodiment of FIG. 12, a branching layer/lack discriminating portion 1002, subsequently reading position information codes by the above number of bits, discriminates whether each code is a position information code or a skip-indication code or a termination code. If the input code is a position information code indicating a branching layer, the portion 1002 determines the branching layer and outputs it to a position information updating portion 802. If the input is a skip-indication code, the portion 1002 outputs the lack-indicating information to a lack processing portion 1003. If the input is a termination code, the decoding device finishes the decoding operation.

On receipt of the information that a skip-indication code has been decoded, the lack processing portion 1003 temporally holds this information and then outputs it to the position information updating portion 802 prior to updating the position information by using a position information code inputted just after the skip-indication code. Like the fourth embodiment, this embodiment also causes the position information updating portion 802 not to output the position information of the lack part and starts the decoding of next position information. By doing so, the decoding device can output only the correct position information without outputting the position information corresponding to the lacking part.

As described before in the fourth embodiment, the operation of the decoding device is not limited to the skipping operation with the lack-indicating information by the position information updating portion 802. For example, the decoding device according to the present invention can adopt such a method that it does not use the position information for the lacking leaf, causing the position information updating portion 802 to operate in the same way as the position information updating portion 513 of FIG. 6 does.

Although the first to sixth embodiments of the present invention have been described in the case of working with retrieval information of video contents, the present invention is not restricted to the above application and can be applied to all kinds of data having a tree structure in which nodes or leaves at the same hierarchical level have a given order relation between them.

In the description of the first to sixth embodiments, there have been disclosed methods of and apparatuses for encoding/decoding position information for retrieval information corresponding to leaves in a tree structure. These coding/decoding methods and apparatuses can be also applied to encode/decode position information for nodes in the tree structure. This may be well understood that each of nodes can be considered as a leaf layer information requiring coding/decoding its position information if it was stripped off all down linked nodes or leaves (or it was assumed to have a single leaf containing all down linked nodes or leaves).

Namely, the present invention can be applied to encoding/decoding node or leaf position information for all kinds of data having a tree structure in which nodes or leaves at the same hierarchical level have a given order relation between them.

According to the present invention, it is possible to effectively encode/decode node or leaf position information for tree-structured data with the saved number of bits by representing the position of the current objective node or leaf only by its change (separating) point from the precedent node or leaf position information.

Even in the case of leaves or nodes are assumed as successively numbered in a tree structure, the occurrence of a lack of any leaf or node therein can be detected and suitably processed to correctly encode/decode position information for respective leaves or nodes in the tree structure.

The invention claimed is:

1. A coding device for encoding position information for an arbitrary number of leaves or nodes of a layer in tree-structured information comprising one or more hierarchical layers each having one or more leaves or nodes sequentially ordered therein, the coding device comprising a branching layer discriminating portion for identifying a hierarchical layer, as a branching layer, at which paths for a current leaf or node and a preceding leaf or node are first separately branched when routing the paths in a tree structure from a root to the leaves or nodes, and a position information coding portion for outputting a code indicating the branching layer as a position information code for the current leaf or node which does not itself specify an absolute position of the current leaf or node in the tree structure.

2. A coding device as defined in claim 1, further comprising a number-of-layers deciding portion for determining a number of hierarchical layers branching off in the tree structure, and a bit size calculating portion for determining a number of bits necessary for encoding position information based on the determined number of hierarchical layers, wherein the position information coding portion codes the position information using no more than the calculated number of bits.

3. A coding device as defined in claim 1, further comprising a skip-indication coding portion which encodes, if there is a lacking leaf or node in the tree structure, information indicating the occurrence of the lack thereat.

4. A coding method of encoding position information for an arbitrary number of leaves or nodes of a layer in tree-structured information comprising one or more hierarchical layers each having one or more leaves or nodes sequentially ordered therein, the method comprising identifying a hierarchical layer, as a branching layer, at which paths for a current leaf or node and a preceding leaf or node are first separately branched when routing the paths in a tree structure from a root to the leaves or nodes, and outputting a code indicating the branching layer as a position information code for the current leaf or node which does not itself specify an absolute position of the current leaf or node in the tree structure.

5. A decoding device for decoding position information codes for tree-structured information comprising one or more hierarchical layers each having one or more leaves or nodes sequentially ordered therein, the decoding device comprising a branching layer discriminating portion for identifying from a position information code a hierarchical layer in which a current leaf or node and a preceding leaf or node are separately branched, and a position information updating portion for incrementing a position number of the identified hierarchical layer in position information of the preceding leaf or node and initializing to an initial value position numbers of all hierarchical layers lower than the identified hierarchical layer in the position information of the preceding leaf or node in the tree structure.

6. A decoding device as defined in claim 5, wherein the decoding device does not output position information of a leaf or node with an input code of information indicating that the leaf or node corresponds to a lacking part.

7. A decoding method of decoding position information codes for tree-structured information comprising one or more hierarchical layers each having one or more leaves or nodes sequentially ordered therein, the method comprising identifying from a position information code a hierarchical layer in which a current leaf or node and a preceding leaf or node are separately branched, and updating by incrementing a position number of the identified hierarchical layer in position information of the preceding leaf or node and initializing to an initial value position numbers of all hierarchical layers lower than the identified hierarchical layer in the position information of the preceding leaf or node in the tree structure.

8. A coding device for encoding position information for an arbitrary number of leaves or nodes of a layer in tree-structured information comprising one or more hierarchical layers each having one or more leaves or nodes sequentially ordered therein, the coding device being configured to identify a hierarchical layer, as a branching layer, at which a first path for a current leaf or node in a hierarchical layer and a second path for a preceding leaf or node in the same hierarchical layer first separately branch when routing the paths in a tree structure from a root to the leaves or nodes, and to output a code indicating the branching layer as a position information code for the current leaf or node which does not itself specify an absolute position of the current leaf or node in the tree structure.

9. The coding device as defined in claim 8, wherein the tree-structured information comprises video content.

10. The coding device as defined in claim 8, being further configured to encode missing node/leaf information in the position information by using a missing node/leaf code.

11. The coding device as defined in claim 8, being further configured to encode missing node/leaf information as part of retrieval information associated with the missing node/leaf.

12. A decoding device for decoding encoded position information for an arbitrary number of leaves or nodes of a layer in tree-structured information comprising one or more hierarchical layers each having one or more leaves or nodes sequentially ordered therein, the decoding device being configured to decode the encoded position information to identify a hierarchical layer at which paths for a current leaf or node and a preceding leaf or node of the same hierarchical level first separately branch when routing the paths in a tree structure from a root to the leaves or nodes and to generate position information for the current leaf or node, based on position information for the preceding leaf or node, which does not itself specify an absolute position of the preceding leaf or node in the tree structure, and the identified hierarchical layer.

13. The decoding device as defined in claim 12, wherein the tree-structured information comprises video content.

14. The decoding device as defined in claim 12, being further configured to decode the encoded position information to identify missing node/leaf codes contained therein.

15. The decoding device as defined in claim 12, being further configured to decode retrieval information associated with nodes or leaves to identify missing nodes or leaves.

* * * * *